Jan. 28, 1969

J. E. CHAMBERS 3,423,905

SPIRAL AIR FILTER

Filed Jan. 3, 1967

INVENTOR.
JOHN E. CHAMBERS
BY
*Bailey & Dority*
ATTORNEYS

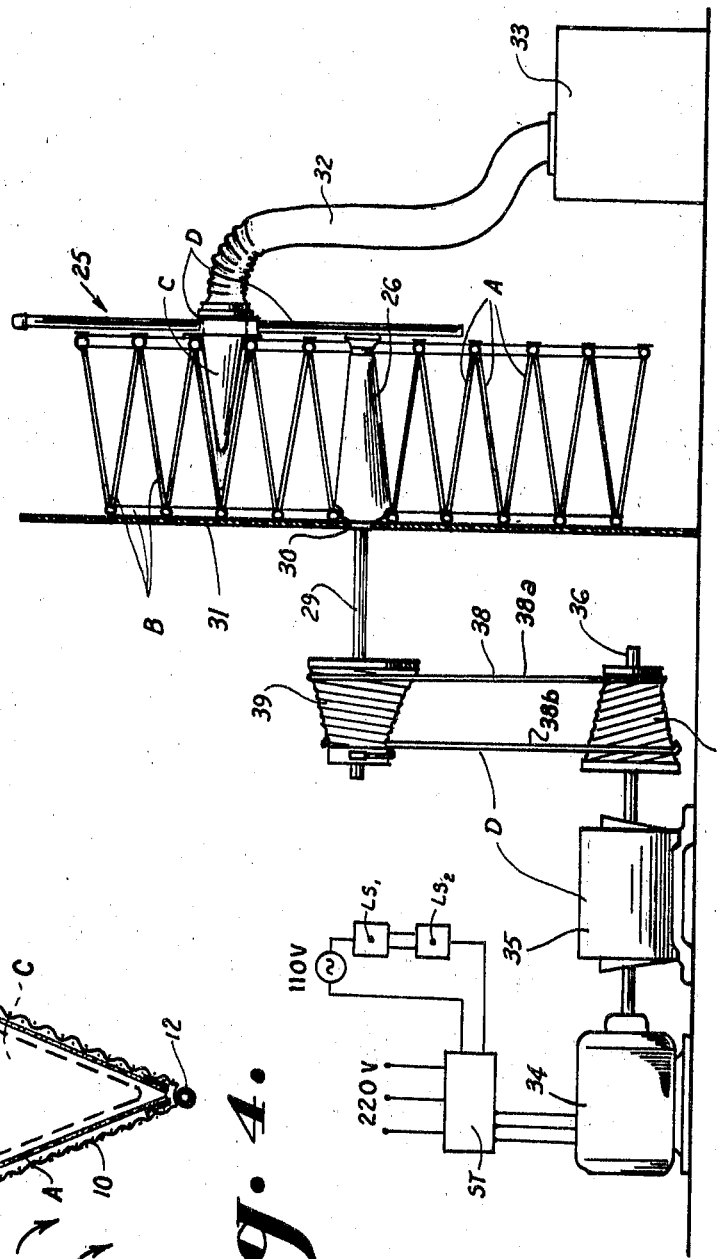
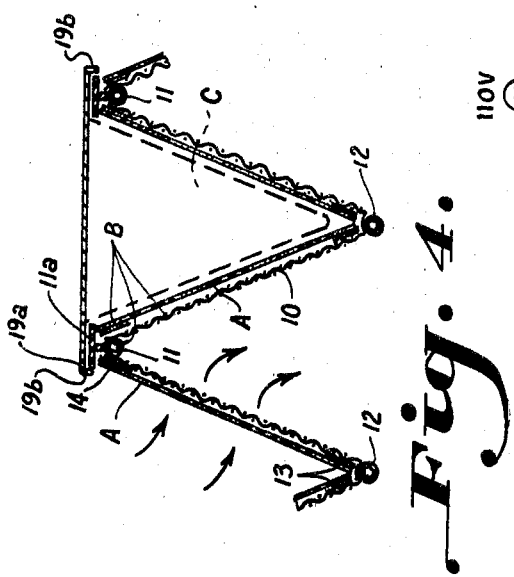
Fig. 3.
Fig. 4.
INVENTOR.
JOHN E. CHAMBERS

United States Patent Office 3,423,905
Patented Jan. 28, 1969

3,423,905
SPIRAL AIR FILTER
John E. Chambers, 323 Parkins Mill Road,
Greenville, S.C. 29607
Filed Jan. 3, 1967, Ser. No. 606,658
U.S. Cl. 55—294         4 Claims
Int. Cl. B01d 35/16

ABSTRACT OF THE DISCLOSURE

A trough shaped spiral air filter including a support means to maintain a filter medium in the trough shape and a movable suction nozzle for cleaning the filter, the nozzle being supported in the trough and guided to follow the spiral configuration of the filter.

---

This invention relates to an air filter having a spiral configuration, and more particularly to an improved filter having an arcuate permanent filter medium providing an enlarged surface area, together with a nozzle for cleaning the medium.

Corrugated air filters have been used in the past primarily as air filters for gasoline vehicles, and some have contemplated curved trough shaped filter mediums having a plurality of nozzles traversing the filter medium in a circular path. Such devices were limited because of the large amounts of suction required to operate the nozzles and such have never been suitable for use for filtering the plant air in large installations, such as textile plants. While the subject filter has many uses, it is thought to be especially useful in such installations as form the subject matter of an application executed and filed Jan. 3, 1967 entitled Air Handling Unit for Industrial Plants Ser. No. 606,977 now Patent No. 3,392,655 wherein the present inventor is one of the joint inventors.

Accordingly, it is an important object of the present invention to provide a spiral filter having a permanent filter medium which may be cleaned with a minimum of apparatus and effort.

Another important object of the invention is to provide a single nozzle filter cleaning means, together with apparatus for causing same to traverse the air intake side of the medium for cleaning same continuously with a minimum of effort while the filter is in operation.

Another important object of the invention is to provide a filter which is easily fabricated and yet provides a maximum of filter surface for handling a large volume of air for the space occupied.

Yet another object of the invention is to provide a filter which has the advantages set forth above and yet minimizes the longitudinal dimension thereof.

The invention contemplates the use of a trough shaped filter medium wound in a spiral in a single plane minimizing the longitudinal dimension increasing the surface area of the filter for the space occupied thereby while facilitating the cleaning of same by a nozzle guided by the trough providing a single concentrated suction point which moves in and out progressively cleaning the medium.

The construction designed to carry out the invention will be hereinafter described, together with other features thereof.

Figure 1:
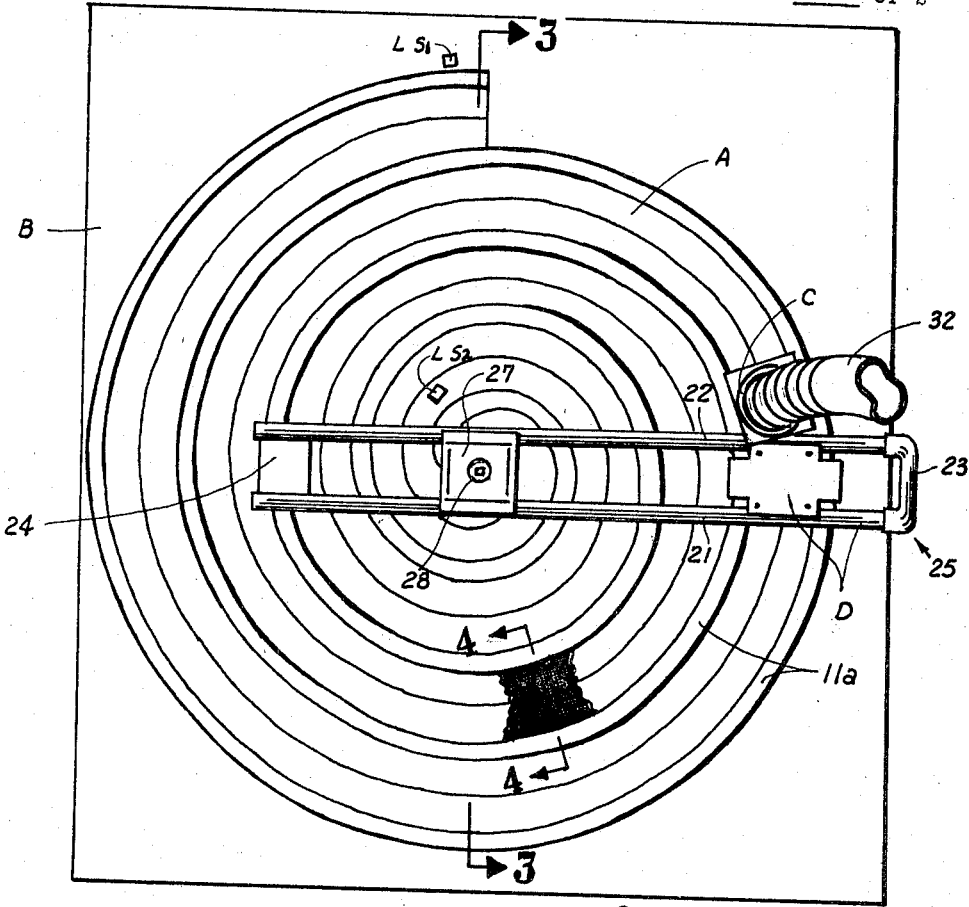
Figure 2:
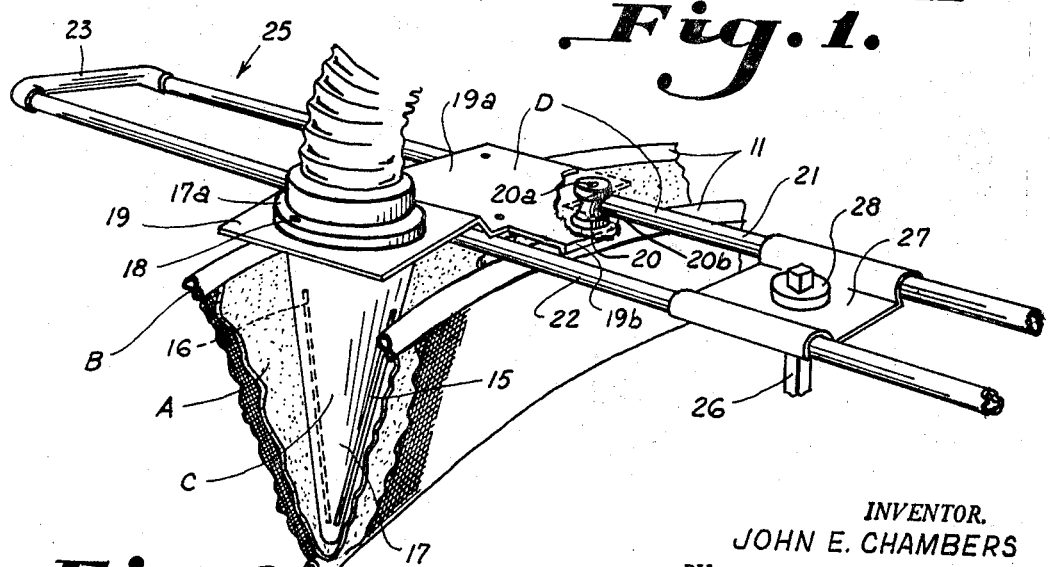

The invention will be more readily understood from a reading of the following specification and by reference to the accompanying drawings forming a part thereof, wherein an example of the invention is shown and wherein:

FIGURE 1 is a front elevation illustrating a filter constructed in accordance with the present invention, FIGURE 2 is an enlarged perspective view, with parts in section and parts omitted, illustrating the nozzle and trough of the filter looking from the upper portion of FIGURE 1 downwardly toward the nozzle, FIGURE 3 is a schematic sectional side elevation, at a reduced scale, illustrating the filter and the drive therefor taken on the line 3—3 in FIGURE 1 with the nozzle turned upwardly through an angle of 90°, and FIGURE 4 is an enlarged transverse sectional elevation taken on the line 4—4 in FIGURE 1 further illustrating the filter medium and associated parts.

Referring more particularly to the drawings, the air filter illustrated includes an elongated trough shaped filter medium A of spiral configuration wherein the bottom of the trough shaped filter medium is in substantially the same plane, and wherein the filter medium extends across a path of air flow with the trough open for receiving the air flow. A support B maintains the filter medium in the configuration described above. A suction nozzle C is positioned within the trough shaped filter medium for cleaning same. Means D is provided for moving said nozzle on a spiral path within the trough shaped filter medium A for cleaning such filter medium. The support serves as a guide for the nozzle when so moving.

The elongated trough shaped filter medium A is preferably constructed of a non-woven polyester, such as Viskon-Aire, sold by Chicopee Mills, Inc., of 1450 Broadway, New York, N.Y. The spiral configuration is important because it affords a maximum of filter surface area, and yet permits the filter support to act as a guide for the nozzle which cleans the filter medium as it traverses the surface thereof. It will be observed that the spiral is tightly wound so that the upper edges of the trough are closely adjacent the upper edges of the next convolution of the spiral as is best illustrated in FIGURE 4.

The support B for the filter medium includes wire mesh shaped in the form of a spiral trough wherein the upper edges are closely adjacent the upper edges of the next convolution. The wire mesh 10 may be in the form of woven wire or expanded metal and the like, and is secured as by welding (not shown) to a support in the form of a pipe and the like, preferably of metal. A spiral pipe 11 is provided at the apex or point of juncture between adjacent spiral convolutions and a spiral pipe 12 is provided in the trough. A T-shaped member 11a is welded in the position illustrated in FIGURE 4 and serves as a guide as described below. A zipper strip 13 is provided on each side of the trough and a zipper strip 14 is provided adjacent the apex and is secured by any suitable adhesive medium to the expanded metal portion 10. These zipper strips employ the usual bent fibers for the purpose of gripping the non-woven filter medium A for maintaining same in position upon the support following the spiral configuration thereof.

A suction nozzle C is positioned within the trough-shaped filter medium for cleaning same, as is best illustrated in FIGURE 2. The nozzle C includes an elongated orifice 15 on one side thereof, and an elongated orifice 16 on the opposite side of the nozzle. A conical portion of the nozzle 17, which is complementary to the trough, accommodates the openings 15 and 16 and an upper flange 17a is carried thereby. The flange 17 is secured as by screws 18 to a bent plate 19 having a substantially rectangular portion 19a which carries a rotatable wheel 20 in each of the corners thereof. The rectangular portion 19a carries inturned flanges 19b which embrace the T-shaped rails 11a for guiding the nozzle as it moves following the spiral configuration of the trough.

The wheels 20 are mounted for rotation upon stub shafts 20a and include a concave medial portion 20b to embrace a pair of longitudinal parallel rails 21 and 22 which form a part of the means D for moving the nozzle on a spiral path within the trough-shaped medium A. The rails 21 and 22 together with transverse supports 23 and 24 form an arm broadly designated at 25. The arm 25 is carried by a rotatable shaft 26 positioned in the medial portion of the filter. The shaft or spindle 26 has fixed connection with the arm as by a bracket 27 which has suitable fastening thereto as illustrated at 28. The spindle 26 is fixed on one end of a shaft 29 and is rotatably carried as at 30 within a vertical support 31 which forms a part of the support B for the filter medium.

As is best seen in FIGURE 3, the nozzle has a flexible hose 32 which connects same to a fan 33 for generating suction within the nozzle C for cleaning the filter medium A.

The means D is driven by a reversible motor 34 through a gear box 35 which has an output shaft 36. The output shaft carries a conical pulley 37, which through a flexible connection 38, drives the conical pulley 39. The flexible connection includes a flexible drive member 38a which operates to move the nozzle from in to out with respect to the spiral filter medium, whereas, the drive member 38b moves the nozzle from out to in. Such a drive is standard and permits maximum speed of rotation of the arm 25 as the nozzle approaches the center so that the nozzle progresses at all times with the relative speed with respect to the filter medium to insure thorough and uniform cleaning thereof.

The motor 34 is energized from a 220 volt three phase source through a conventional starter ST (FIGURE 3). The controls for the starter include a pair of conventional three-way limit switches $LS_1$ and $LS_2$ on the outside and inside, respectively, of the spiral filter. The limit switches are wired together in a conventional manner and connected to a 110 volt source so that when one of the limit switches is closed by engagement by the nozzle C the motor 34 will rotate in a first direction and when the other of the limit switches is closed by engagement by the nozzle C the motor will rotate in the other direction.

What is claimed is:
1. An air filter comprising, an elongated trough-shaped filter medium of spiral configuration wherein the bottom of the trough-shaped filter medium is in substantially the same plane and wherein the filter medium extends across a path of air flow with the trough open for receiving the air flow, a support maintaining the filter medium in said configuration, a suction nozzle positioned within said trough-shaped filter medium, and means for moving said nozzle on a spiral path within said trough-shaped filter medium for cleaning said filter medium, said support serving as a guide for said nozzle when so moving.

2. The structure set forth in claim 1, wherein said means for moving said nozzle includes, an arm extending from the medial portion of said filter medium across and adjacent the spiral configuration on the air receiving side thereof, means mounting said suction nozzle for movement along said arm, and means alternately turning said arm first in one direction moving the nozzle inwardly toward the medial portion of the filter and then in the opposite direction moving the nozzle outwardly toward a marginal portion of the filter, said means turning arm including means varying the speed of turning said arm so that the rate of relative movement between the nozzle and the medium remains substantially constant.

3. The structure set forth in claim 1, wherein said support includes wire mesh shaped in the form of a spiral trough having upper edges closely adjacent the upper edges of the next spiral convolution, a zipper strip having bent fiber portions carried upon the wire for positioning the filter medium within the wire mesh following the spiral trough-shaped configuration thereof, a trackway carried by adjacent upper trough portions for guiding the nozzle, and wherein said filter medium is a nonwoven synthetic fibrous sheet.

4. The structure set forth in claim 1, wherein said nozzle includes a pair of downwardly extending sides converging toward the bottom thereof, said sides being substantially complementary to said trough and having openings therein extending substantially from the top to the bottom of said trough.

References Cited

FOREIGN PATENTS 457,604 7/1913 France.
909,345 10/1962 Great Britain.

FRANK W. LUTTER, *Primary Examiner.*

U.S. Cl. X.R.

55—520